United States Patent
Niu et al.

(10) Patent No.: US 10,365,438 B2
(45) Date of Patent: Jul. 30, 2019

(54) BACKLIGHT UNIT, LIQUID CRYSTAL DISPLAY AND METHOD OF MAKING THE SAME

(71) Applicants: BOE Technology Group Co., Ltd., Beijing (CN); Beijing BOE Optoelectronics Technology Co., Ltd., Beijing (CN)

(72) Inventors: Xiaochen Niu, Beijing (CN); Xue Dong, Beijing (CN); Xiaochuan Chen, Beijing (CN); Wenqing Zhao, Beijing (CN); Ming Yang, Beijing (CN); Qian Wang, Beijing (CN); Pengcheng Lu, Beijing (CN); Jian Gao, Beijing (CN); Lei Wang, Beijing (CN); Rui Xu, Beijing (CN); Pengpeng Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 155 days.

(21) Appl. No.: 15/505,156

(22) PCT Filed: Aug. 12, 2016

(86) PCT No.: PCT/CN2016/094985
§ 371 (c)(1),
(2) Date: Feb. 20, 2017

(87) PCT Pub. No.: WO2017/118025
PCT Pub. Date: Jul. 13, 2017

(65) Prior Publication Data
US 2018/0031917 A1    Feb. 1, 2018

(30) Foreign Application Priority Data

Jan. 8, 2016  (CN) .......................... 2016 1 0012307

(51) Int. Cl.
*G02B 6/293*    (2006.01)
*G02F 1/1335*   (2006.01)

(52) U.S. Cl.
CPC ..... *G02B 6/2938* (2013.01); *G02F 1/133504* (2013.01); *G02F 1/133602* (2013.01); *G02F 1/133621* (2013.01); *G02F 2201/305* (2013.01)

(58) Field of Classification Search
None
See application file for complete search history.

(56) References Cited

U.S. PATENT DOCUMENTS

2005/0052732 A1   3/2005   Chen et al.
2008/0049280 A1   2/2008   Lee et al.
(Continued)

FOREIGN PATENT DOCUMENTS

CN   101131516 A   2/2008
CN   101149445 A   3/2008
(Continued)

OTHER PUBLICATIONS

Nov. 8, 2016—(WO) International Search Report and Written Opinion Appn PCT/CN2016/094985 with English Tran.
(Continued)

*Primary Examiner* — Darryl J Collins
*Assistant Examiner* — Journey F Sumlar
(74) *Attorney, Agent, or Firm* — Banner & Witcoff, Ltd.

(57) ABSTRACT

A backlight unit, a liquid crystal display and method of manufacturing the same are provided. The backlight unit includes a backlight source and a diffraction grating disposed on the backlight source. The diffraction grating is etched on the backlight source, each of monochromatic light emitting units in the backlight source corresponds to N grating patterns on the diffraction grating, where N is a natural number greater than 1.

13 Claims, 6 Drawing Sheets

(56) References Cited

U.S. PATENT DOCUMENTS

| | | | | |
|---|---|---|---|---|
| 2008/0084709 A1* | 4/2008 | Li | .................. | G02B 6/0016 |
| | | | | 362/616 |
| 2008/0123087 A1 | 5/2008 | Chen | | |
| 2008/0158486 A1* | 7/2008 | Kim | .................. | G02F 1/133555 |
| | | | | 349/106 |
| 2017/0363794 A1* | 12/2017 | Wan | .................. | G02B 27/22 |

FOREIGN PATENT DOCUMENTS

| | | |
|---|---|---|
| CN | 102362215 A | 2/2012 |
| CN | 103207470 A | 7/2013 |
| CN | 103487983 A | 1/2014 |
| CN | 103576385 A | 2/2014 |
| CN | 104460115 A | 3/2015 |
| CN | 205281086 U | 6/2016 |
| WO | 2014051623 A1 | 4/2014 |

OTHER PUBLICATIONS

Apr. 9, 2019—(CN) First Office Action Appn 201610012307.2 with English Translation.

\* cited by examiner

BACKLIGHT UNIT, LIQUID CRYSTAL DISPLAY AND METHOD OF MAKING THE SAME

The application is a U.S. National Phase Entry of International Application No. PCT/CN2016/094985 filed on Aug. 12, 2016, designating the United States of America and claiming priority to 201610012307.2 filed on Jan. 8, 2016. The present application claims priority to and the benefit of the above-identified applications and the above-identified applications are incorporated by reference herein in their entirety.

BACKGROUND

The embodiment of the present disclosure relates to a backlight unit, a liquid crystal display and a method of making the same.

With the rapid development of techniques in the display field, the requirements for the display device are getting higher and higher. Being thinner, energy-saving, having delicate pictures and reduced cost have always been the goals for the growth of the display devices. However, the multi-layer structure of the backlight unit, the TFT substrate, the lower polarizing sheet, the color filter substrate and the upper polarizing sheet limits the thickness of a traditional liquid crystal display, and it is difficult to make it thinner. Furthermore, the use of color filters consumes at least 60% of the optical energy, and the requirement for brightness of the devices can only be satisfied by increasing the backlight brightness, which undoubtedly increases the power consumption.

SUMMARY

Embodiments of the present disclosure provide a backlight unit, a liquid crystal display and method of making the same.

According to embodiments of the present disclosure, a backlight unit is provided. The backlight unit includes a backlight source and a diffraction grating disposed on the backlight source. The diffraction grating is etched on the backlight source. Each of monochromatic light emitting units in the backlight source corresponds to N grating patterns on the diffraction grating, where N is a natural number greater than 1.

For example, the backlight source is a direct-type backlight source.

For example, the light emitted by each of the monochromatic light emitting units in the backlight source is a collimated light.

For example, the backlight source includes monochromatic light emitting units emitting three kinds of monochromatic collimated lights of red, green, and blue, respectively.

For example, the diffraction grating is a sinusoidal phase grating or blazed grating.

For example, the diffraction grating is a sinusoidal phase grating. If its inclination angle is $\theta_G$, its grating constant is $\Lambda$, its grating length is L, its thickness is d, its complex amplitude projection coefficient is:

$$t(r_q) = \left[\sum_{q=-\infty}^{\infty} J_q(v)\exp(i2\pi q u r_q)\right] \cdot rect\left(\frac{r_q}{L}\right),$$

where q represents the diffraction order of the diffraction grating, $J_q$ represents the first class Bessel function of order q; $u=1/\Lambda$ represents the spatial frequency of the grating; $r_q=(\alpha_q, \beta_q, \gamma_q)$ represents the directional cosine of the emitting light; the intensity of the emitting light is modulated by $v=2\pi\Delta nd/\lambda$, $\Delta n$ represents the refractive index of the grating, $\lambda$ represents the wavelength.

For example, the diffraction grating is a sinusoidal phase grating, if the directional cosine of the incident light of the sinusoidal phase grating is $(\alpha, \beta, \gamma)$, the emitting direction of the emitting light of the sinusoidal phase grating is $(\alpha_q, \beta_q, \gamma_q)$, and satisfies the following relationship:

$$\begin{cases} \alpha_q = \alpha + q\frac{\lambda}{\Lambda}\cos\theta_G \\ \beta_q = \beta + q\frac{\lambda}{\Lambda}\sin\theta_G \\ \gamma_q = (1 - \alpha_q^2 - \beta_q^2)^{1/2} \end{cases}.$$

For example, a preset angle is formed between various grating patterns on the diffraction grating corresponded by each of the monochromatic light emitting units in the backlight source, so that the incident light emitted by the monochromatic light emitting unit is emitted at N angles.

For example, arrangements of the N grating patterns on the diffraction grating corresponded by each of the monochromatic light emitting units in the backlight source are not all the same.

For example, arrangements of the N grating patterns on the diffraction grating corresponded by adjacent monochromatic light emitting units in the backlight source are different.

Embodiments of the present disclosure also provide a liquid crystal display, including the backlight unit.

For example, the liquid crystal display further includes a light scattering film disposed on the diffraction grating, and a thin film transistor TFT substrate, a liquid crystal layer and a polarizing sheet disposed in turn on the light scattering film.

For example, the TFT substrate includes an electrode structure in a display mode of twisted nematic (TN), an in-plane switching (IPS), or a vertical alignment (VA).

Embodiments of the present disclosure also provide a method of manufacturing the liquid crystal display, including preparing a backlight source; forming a diffraction grating on the backlight source; forming a light scattering film on the diffraction grating; and forming a thin film transistor TFT substrate, a liquid crystal layer and a polarizing sheet in turn on the light scattering film. The diffraction grating is etched on the backlight source, each of monochromatic light emitting units in the backlight source corresponds to N grating patterns on the diffraction grating, where N is a natural number greater than 1.

BRIEF DESCRIPTION OF THE DRAWINGS

Embodiments of the present disclosure will be described in detail hereunder in conjunction with accompanying drawings to allow one of ordinary skill in the art to understand the present disclosure more clearly, in which.

DETAILED DESCRIPTION

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any inventive work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Embodiments of the present disclosure provide a backlight unit, a liquid crystal display and a method of manufacturing the same, which could achieve a more thinner liquid crystal display, and could improve the luminous efficiency of the liquid crystal display and reduce the power consumption and product cost.

A backlight unit provided by an embodiment of the present disclosure includes a backlight source and a diffraction grating provided on the backlight source. The diffraction grating is etched on the backlight source, each of monochromatic light emitting units in the backlight source corresponds to N grating patterns on the diffraction grating, where N is a natural number greater than 1. In this way, the lower polarizing sheet and the color filter substrate can be omitted from the liquid crystal display including the backlight unit, and a more thinner liquid crystal display is obtained and the light efficiency of the liquid crystal display is improved as well as the power consumption is reduced. The addition of the diffraction grating is to adjust the emitting direction of the light, it is possible to reduce the density of the backlight array and reduce the cost as well as improve the light efficiency.

Figure 1:
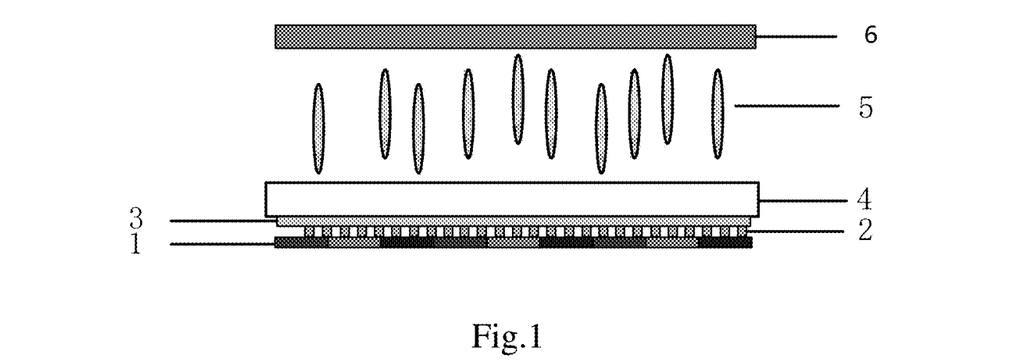
FIG. 1 is a structural schematic view of a liquid crystal display according to an embodiment of the present disclosure.

Referring to FIG. 1, a thin liquid crystal display provided by an embodiment of the present disclosure capable of improving the utilization efficiency of backlight includes a direct-type backlight source 1, a diffraction grating 2, a light scattering film 3, a thin film transistor (TFT) substrate 4, a liquid crystal layer 5, a polarizing sheet 6 arranged in turn from bottom to top.

Figure 2:
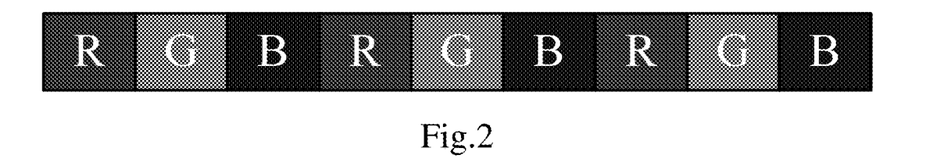
FIG. 2 is a structural schematic view of a backlight source according to an embodiment of the present disclosure.

The backlight source 1 may be a direct-type backlight source. Referring to FIG. 2, the backlight source 1 uses red (R), green (G), and blue (B) monochromatic collimated light. The direct-type backlight source could eliminate the use of the color filter substrate, to improve the luminous efficiency and reduce power consumption, so that the display picture becomes more delicate and vivid. The diffraction grating 2 could reduce the density of the backlight array, so as to reduce the cost. The light scattering film 3 allows the backlight emitted from the backlight source 1 to emit evenly in all directions The liquid crystal display provided by an embodiment of the present disclosure is provided with only an upper polarizing sheet 6 without any lower polarizing sheet and the color filter substrate, so that the thickness of the liquid crystal display provided by the embodiment of the present disclosure is significantly reduced and becomes thinner. The liquid crystal display provided by the embodiment of the present disclosure does not need a color filter substrate, which could improve light efficiency and reduce power consumption.

The diffraction grating 2 in the liquid crystal display provided by the embodiment of the present disclosure may be, for example, a sinusoidal phase grating, etched on the backlight source 1. In the configuration of the backlight source 1, the portion of the diffraction grating 2 corresponding to each of monochromatic light emitting units includes N grating patterns, where N is a natural number greater than 1. The diffraction grating 2 is configured to adjust the emitting direction of light, so as to reduce the density of the monochromatic light emitting unit array on the backlight source 1 and save cost.

The diffraction grating 2 may also be, for example, a blazed grating. For example, the blazed grating may also be formed on the backlight source 1 by an etching process. A blazed grating refers to a grating when a grating is scored into a serrated cross section (for example, a triangular section), the light energy of the grating is concentrated in a predetermined direction, i.e., at a certain spectrum level, when it is detected in this direction, the spectral intensity is the largest.

Figure 3:
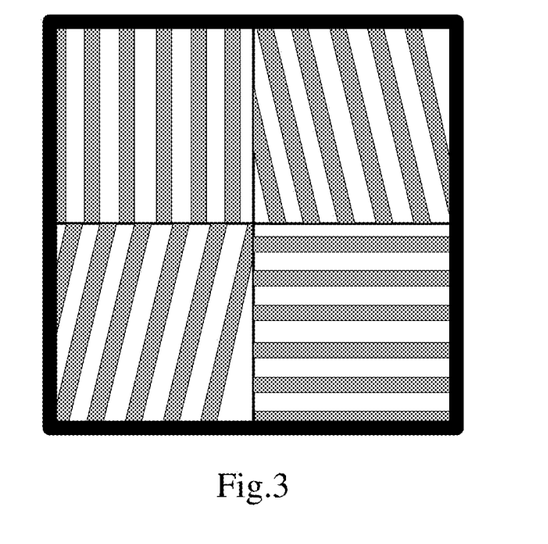
FIG. 3 is a schematic view showing four grating patterns at a portion of the diffraction grating corresponding to one of monochromatic light emitting units of the backlight source according to an embodiment of the present disclosure.
Figure 4:
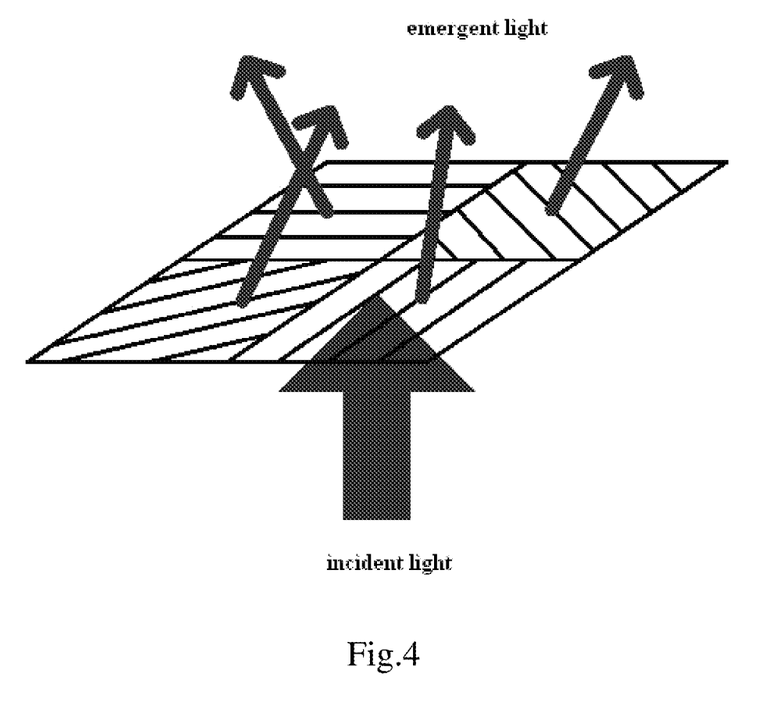
FIG. 4 is a schematic view of a situation where light emitted by one of monochromatic light emitting units on the backlight source passes through a corresponding grating on the diffraction grating and then emits four directions of emitting light according to an embodiment of the present disclosure.
Figure 5:
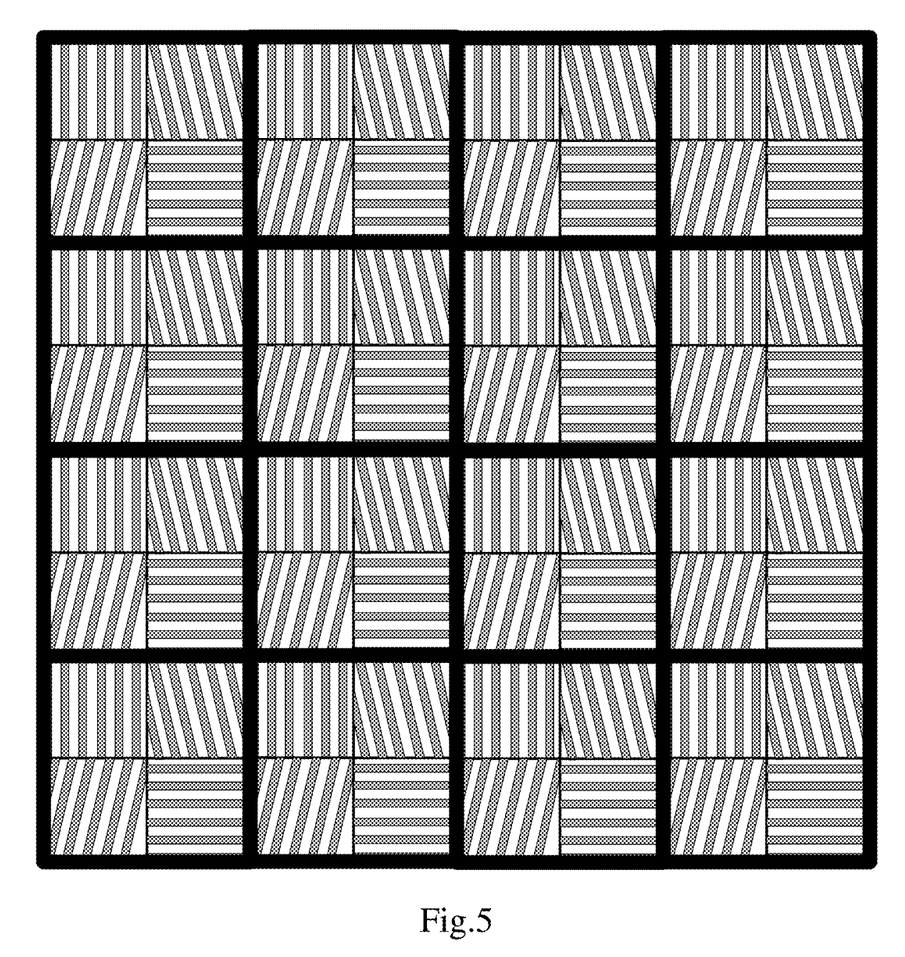
FIG. 5 is a schematic view of the overall grating pattern of the diffraction grating corresponding to the entire display area of the backlight source according to an embodiment of the present disclosure.

For example, in an instance that N equals to 4, as shown in FIG. 3, a portion of a diffraction grating 2, corresponding to each of monochromatic light emitting units in the structure of the backlight source 1, includes 4 grating patterns, and gratings corresponding to the four grating patterns form angles different from each other. A incident light from each of the monochromatic light emitting units of the backlight source 1 passes through the gratings on the diffraction grating 2, exits at four angles, as shown in FIG. 4. FIG. 5 shows the grating arrangement of the diffraction grating 2 at the entire display area corresponding to the backlight source 1. It is noted that FIG. 5 is merely a schematic view, the grating angles of different pixels may also be different, that is, the grating pattern corresponding each of the pixel units may be the same or different, and can be adjusted according to the emitting direction. The functional principle of the gratings according to embodiments of the present invention will be described below.

The functional principle of the diffraction grating is introduced below:

For example, when the diffraction grating is a sinusoidal phase grating, if its inclination angle is $\theta_G$, its grating constant is $\Lambda$, its grating length is L, its thickness is d, its complex amplitude projection coefficient $t(r_q)$ may be obtained through the following equation:

$$t(r_q) = \left[\sum_{q=-\infty}^{\infty} J_q(v) \exp(i2\pi q u r_q)\right] \cdot rect\left(\frac{r_q}{L}\right) \quad \text{Equation 1}$$

where q represents the diffraction order of the diffraction grating; $J_q$ represents the first class Bessel function of order q; $u=1/\Lambda$ represents the spatial frequency of the grating; $r_q=(\alpha_q, \beta_q, \gamma_q)$ represents the directional cosine of the emitting light; the intensity of the emitting light is modulated by $v=2\pi\Delta n d/\lambda$, $\Delta n$ is the refractive index of the grating, and $\lambda$ is a wavelength.

In this way, the sinusoidal phase grating can modulate the phase of its incident light, for example, after the incident light of a directional cosine $(\alpha, \beta, \gamma)$ passes through the sinusoidal phase grating, its emitting direction turns into $(\alpha_q, \beta_q, \gamma_q)$, then, they have the following relationship shown in Equation 2:

$$\begin{cases} \alpha_q = \alpha + q\frac{\lambda}{\Lambda}\cos\theta_G \\ \beta_q = \beta + q\frac{\lambda}{\Lambda}\sin\theta_G \\ \gamma_q = (1 - \alpha_q^2 - \beta_q^2)^{1/2} \end{cases} \quad \text{Equation 2}$$

The equation 2 tells that, for the sinusoidal phase grating, the emitting angle of light is associated with the angle of incident light, the grating parameters and wavelength $\lambda$. In an instance that other conditions remain unchanged and only the inclination angle $\theta_G$ of the gratings is changed, the emitting direction of light changes accordingly, so that a phenomenon as shown in FIG. 4 would be present.

Figure 6:
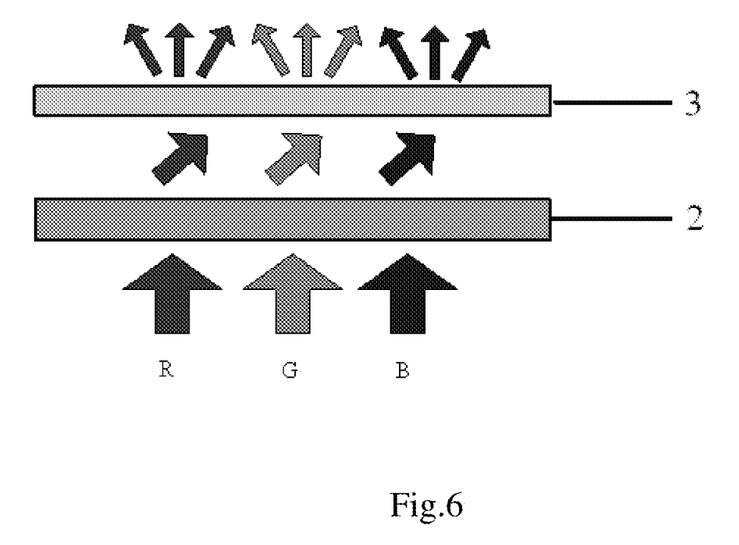
FIG. 6 is a schematic view showing that the incident light of different colors from the backlight source passes through the diffraction grating and the light scattering film and then emits light of different colors uniformly propagating in all directions according to an embodiment of the present disclosure.

The light emitted by the gratings can only run along a specific angle, therefore, further, in order to enlarge the visible range, the liquid crystal display provided by an embodiment of the present disclosure is provided with a light scattering film 3, so that the light emitted from the diffraction grating 2 can be propagated in all directions uniformly, as shown in FIG. 6.

Figure 7:
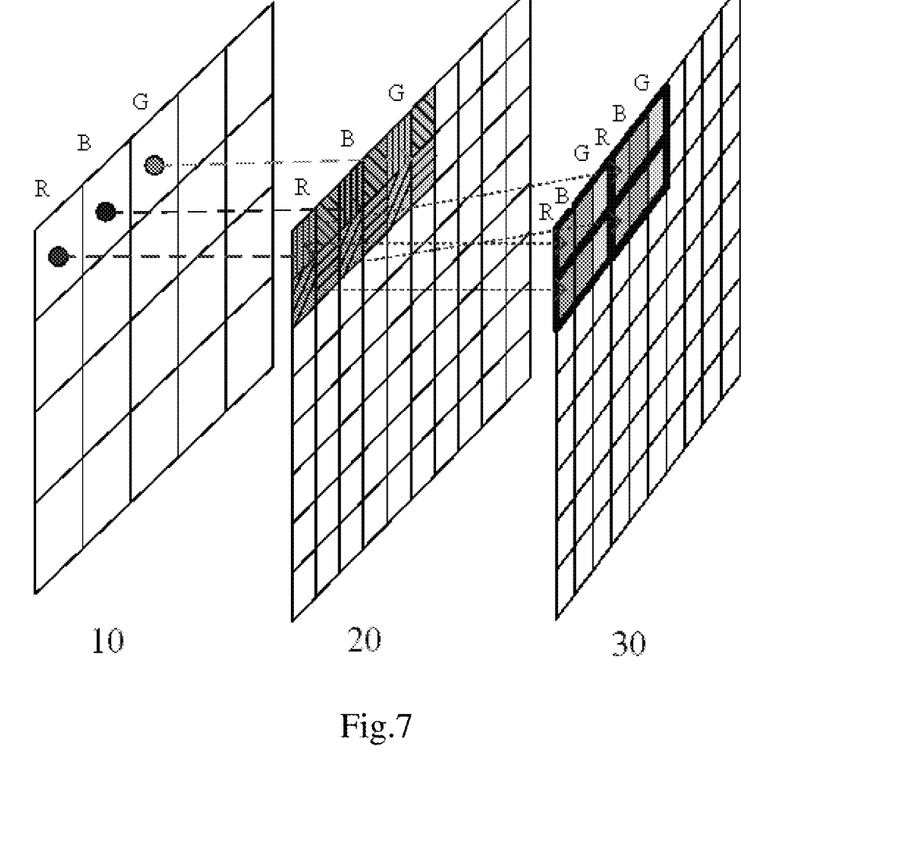
FIG. 7 is a schematic view showing that light emitted by monochromatic light emitting unit of different colors on a backlight source after being subjected to a diffraction grating, provides backlight of different colors for different sub-pixel units on a TFT substrate, to achieve the color display according to an embodiment of the present disclosure.

The R, G, B lights have different wavelengths from each other, and by adjusting the grating parameters reasonably, it is possible to create the effect as shown in FIG. 7. That is, after the red monochromatic light emitting unit on the backlight source is subjected to a diffraction grating, it can provide a red backlight for the four different sub-pixel units on the TFT substrate; after the blue monochromatic light emitting unit on the backlight source is subjected to a diffraction grating, it can provide a blue backlight for the four different sub-pixel units on the TFT substrate; after the green monochromatic light emitting unit on the backlight source is subjected to a diffraction grating, it can provide a green backlight for the four different sub-pixel units on the TFT substrate. Each sub-pixel unit does not overlap with each other, and three sub-pixel units of different colors compose one complete pixel unit to realize color display. The backlight array 10 in FIG. 7 includes each monochromatic light emitting unit on the backlight source; the diffraction grating array 20 in FIG. 7 includes the grating corresponding to each of the monochromatic light emitting unit. The TFT array 30 of FIG. 7 includes TFT(s).

In this way, the liquid crystal display provided by the embodiment of the present disclosure is designed to allow the resolution of the display device not to depend on the density of the backlight array, so that the cost of the direct-type backlight source is reduced.

It is noted that, in the embodiments of the present disclosure, the number of gratings corresponding to each monochromatic light emitting units on the backlight source has no limitation under the condition of satisfying the process capability. For example, each of the monochromatic light emitting units in the embodiment of the present disclosure corresponds four gratings, but the embodiments of the present disclosure are not limited thereto. The arrangement of various grating patterns corresponding to each of the monochromatic light emitting units on the backlight source has no limitation, in which the N gratings form a certain angle so that the emitting light exits at N angles and the pixel composition structure can be satisfied. The electrode structure of the TFT substrate has no limitation. For example, the electrode structure can be a TN, IPS, or VA display mode, and the TFT substrate may be a TFT glass substrate. The arrangement of the monochromatic light emitting units on the backlight source and the pixel rendering structure have no limitations. For example, the Real, BV, Pentile manners can be used.

Figure 8:
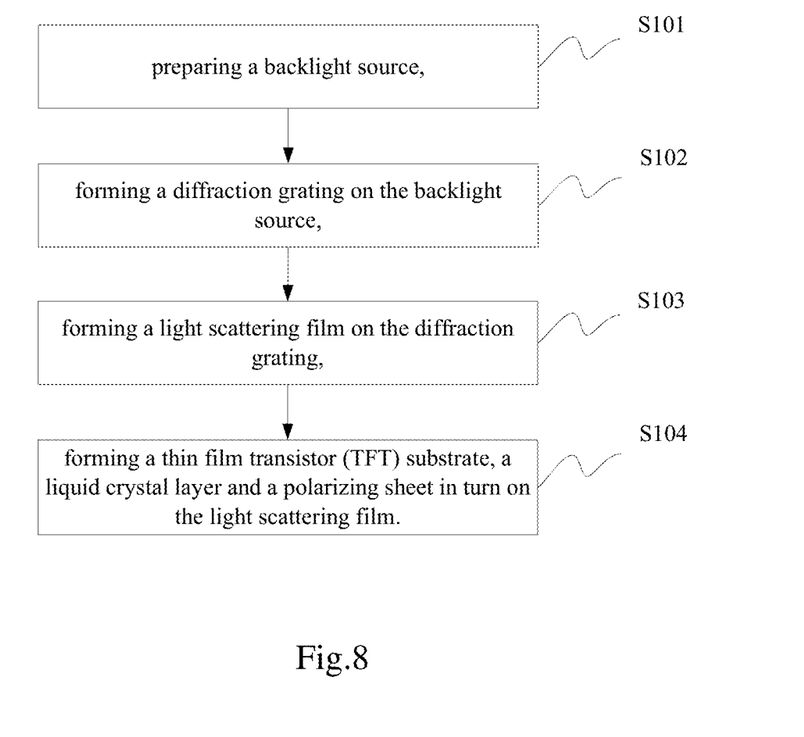
FIG. 8 is a schematic view showing the flow chart of a process of manufacturing a liquid crystal display according to an embodiment of the present disclosure.

Referring to FIG. 8, a method of manufacturing the liquid crystal display provided by an embodiment of the present disclosure includes steps below.

S101. preparing a backlight source.

S102. forming a diffraction grating on the backlight source.

S103. forming a light scattering film on the diffraction grating.

S104. forming a thin film transistor (TFT) substrate, a liquid crystal layer and a polarizing sheet in turn on the light scattering film.

The diffraction grating is etched on the backlight source, and each of monochromatic light emitting units in the backlight source corresponds to N grating patterns on the diffraction grating, where N is a natural number greater than 1.

In general, the embodiments of the present disclosure can significantly reduce the unit thickness of the liquid crystal display, and improve the luminous efficiency of the backlight source and the power consumption of the device and the product cost can be reduced.

The foregoing are merely exemplary embodiments of the disclosure, but the embodiments of the present disclosure are not limited thereto. For one of ordinary skill in the art, various alternations and improvements may be made without departing from the scope of embodiments of the present disclosure, and all of which shall fall within the scope of the present disclosure.

The present disclosure claims the priority to Chinese patent application No. 201610012307.2 entitled "BACKLIGHT UNIT, LIQUID CRYSTAL DISPLAY AND METHOD OF MANUFACTURING THE SAME" filed on Jan. 8, 2016, the entirety of which is incorporated herein by reference.

What is claimed is:

1. A backlight unit, comprising:
a backlight source and a diffraction grating provided on the backlight source;
wherein each of monochromatic light emitting units in the backlight source corresponds to N grating patterns on the diffraction grating, where N is a natural number greater than 1, wherein the diffraction grating is a sinusoidal phase grating, if its inclination angle is $\theta_G$, its grating constant is $\Lambda$, its grating length is L, its thickness is d, its complex amplitude projection coefficient is:

$$t(r_q) = \left[\sum_{q=-\infty}^{\infty} J_q(v)\exp(i2\pi qur_q)\right] \cdot rect\left(\frac{r_q}{L}\right)$$

where q represents the diffraction order of the diffraction grating, $J^q$ represents the first class Bessel function of order q; $u=1/\Lambda$ represents the spatial frequency of the grating; $r_q=(\alpha_q, \beta_q, \gamma_q)$ represents the directional cosine of the emitting light; the intensity of the emitting light is modulated by $v=2\pi\Delta nd/\lambda$, $\Delta n$ represents the refractive index of the grating, $\lambda$ represents the wavelength.

2. The backlight unit according to claim 1, wherein the backlight source is a direct-type backlight source.

3. The backlight unit according to claim 2, wherein the light emitted by each of the monochromatic light emitting units in the backlight source is a collimated light.

4. The backlight unit according to claim 3, wherein the backlight source comprises monochromatic light emitting units emitting three kinds of monochromatic collimated lights of red, green, and blue, respectively.

5. The backlight unit according to claim 1, wherein the directional cosine of the incident light of the sinusoidal phase grating is $(\alpha, \beta, \gamma)$, the emitting direction of the emitting light of the sinusoidal phase grating is $(\alpha_q, \beta_q, \gamma_q)$, and satisfies the following relationship:

$$\begin{cases} \alpha_q = \alpha + q\frac{\lambda}{\Lambda}\cos\theta_G \\ \beta_q = \beta + q\frac{\lambda}{\Lambda}\sin\theta_G \\ \gamma_q = (1 - \alpha_q^2 - \beta_q^2)^{1/2} \end{cases}$$

6. The backlight unit according to claim 1, wherein a preset angle is formed between various grating patterns on the diffraction grating corresponded by each of the monochromatic light emitting units in the backlight source, so that the incident light emitted by the monochromatic light emitting unit is emitted at N angles.

7. The backlight unit according to claim 1, wherein arrangements of the N grating patterns on the diffraction grating corresponded by each of the monochromatic light emitting units in the backlight source are not all the same.

8. The backlight unit according to claim 1, wherein arrangements of the N grating patterns on the diffraction grating corresponded by adjacent monochromatic light emitting units in the backlight source are different.

9. A liquid crystal display, comprising a backlight unit, wherein the backlight unit comprises,
a backlight source and a diffraction grating provided on the backlight source;
wherein each of monochromatic light emitting units in the backlight source corresponds to N grating patterns on the diffraction grating, where N is a natural number greater than 1, and
wherein the diffraction grating is a sinusoidal phase grating, if its inclination angle is $\theta_G$, its grating constant is $\Lambda$, its grating length is L, its thickness is d, its complex amplitude projection coefficient is:

$$t(r_q) = \left[\sum_{q=-\infty}^{\infty} J_q(v)\exp(i2\pi qur_q)\right] \cdot rect\left(\frac{r_q}{L}\right)$$

where q represents the diffraction order of the diffraction grating, $J_q$ represents the first class Bessel function of order q; $u=1/\Lambda$ represents the spatial frequency of the grating; $r_q(\alpha_q, \beta_q, \gamma_q)$ represents the directional cosine of the emitting light; the intensity of the emitting light is modulated by $v=2\pi\Delta nd/\lambda$, represents the refractive index of the grating, $\lambda$ represents the wavelength.

10. The liquid crystal display according to claim 9, further comprising a light scattering film disposed on the diffraction grating, and a thin film transistor TFT substrate, a liquid crystal layer and a polarizing sheet disposed in turn on the light scattering film.

11. The liquid crystal display according to claim 10, wherein the TFT substrate comprises an electrode structure in a display mode of twisted nematic (TN), an in-plane switching (IPS), or a vertical alignment (VA).

12. A method of manufacturing the liquid crystal display, comprising:
preparing a backlight source;
forming a diffraction grating on the backlight source;
forming a light scattering film on the diffraction grating; and
forming a thin film transistor TFT substrate, a liquid crystal layer and a polarizing sheet in turn on the light scattering film;
wherein the diffraction grating is etched on the backlight source, each of the monochromatic light emitting units in the backlight source corresponds to N grating patterns on the diffraction grating, where N is a natural number greater than 1;
wherein the formed diffraction grating is a sinusoidal phase grating, if its inclination angle is $\theta_G$, its grating constant is $\Lambda$, its grating length is L, its thickness is d, its complex amplitude projection coefficient is:

$$t(r_q) = \left[\sum_{q=-\infty}^{\infty} J_q(v)\exp(i2\pi qur_q)\right] \cdot rect\left(\frac{r_q}{L}\right)$$

where q represents the diffraction order of the diffraction grating, $J_q$ represents the first class Bessel function of order q; $u=1/\Lambda$ represents the spatial frequency of the grating; $r_q(\alpha_q, \beta_q, \gamma_q)$ represents the directional cosine of the emitting light; the intensity of the emitting light is modulated by $v=2\pi\Delta nd/\lambda$, $\Delta n$ represents the refractive index of the grating, $\lambda$ represents the wavelength.

13. The method according to claim 12, wherein the sinusoidal phase grating is formed on the backlight source by an etching process.

* * * * *